US011390257B2

(12) United States Patent
Marcolongo et al.

(10) Patent No.: US 11,390,257 B2
(45) Date of Patent: Jul. 19, 2022

(54) MOTOR-VEHICLE BRAKING SYSTEM HAVING A VACUUM-OPERATED ASSISTANCE DEVICE

(71) Applicant: FCA Italy S.p.A., Turin (IT)

(72) Inventors: Gianluca Marcolongo, Turin (IT); Renato Badino, Turin (IT); Michele Ieluzzi, Turin (IT); Giovanni Gabiati, Turin (IT); Stefano Lucà, Turin (IT); Paolo Graziano, Turin (IT)

(73) Assignee: FCA Italy S.p.A.

( * ) Notice: Subject to any disclaimer, the term of this patent is extended or adjusted under 35 U.S.C. 154(b) by 75 days.

(21) Appl. No.: 16/816,329

(22) Filed: Mar. 12, 2020

(65) Prior Publication Data

US 2020/0298811 A1   Sep. 24, 2020

(30) Foreign Application Priority Data

Mar. 21, 2019   (EP) .................................... 19164242

(51) Int. Cl.
*B60T 13/57* (2006.01)
*B60T 13/24* (2006.01)
(Continued)

(52) U.S. Cl.
CPC ............ *B60T 13/57* (2013.01); *B60T 13/246* (2013.01); *B60T 13/72* (2013.01); *B60T 17/02* (2013.01);
(Continued)

(58) Field of Classification Search
CPC ................. F02D 2250/41; F02D 41/06; F02D 2200/0406; B60T 13/52; B60T 13/72;
(Continued)

(56) References Cited

U.S. PATENT DOCUMENTS 3,627,386 A * 12/1971 Every .................... B60T 8/448
                                                    303/61
3,950,946 A *  4/1976 Sakai ..................... F04B 45/04
                                                    60/407
(Continued)

FOREIGN PATENT DOCUMENTS

CN         108909700 A    11/2018
EP           1681219 A2    7/2006
(Continued)

OTHER PUBLICATIONS

European Search Report dated Sep. 6, 2019. 6 pages.

*Primary Examiner* — Robert A. Siconolfi
*Assistant Examiner* — San M Aung
(74) *Attorney, Agent, or Firm* — RMCK Law Group PLC

(57) ABSTRACT

A vehicle braking system includes an assistance device having a vacuum pump driven by an engine for communicating vacuum to a chamber of the assistance device. A control valve is interposed along a fluid line between the pump and the chamber. The control valve is in its first operative condition, where the inlet side of the vacuum pump communicates with the chamber, when pressure within the chamber is above a predetermined value; and is in its second operative condition, where the inlet side of the vacuum pump communicates with the atmosphere, when pressure within the chamber is below a predetermined value. In this second condition the pump intakes air from and feeds air into the atmosphere, thereby reducing the energy consumption by the engine required for driving the pump during stages where, within the chamber, there is a vacuum sufficient for the regular operation of the braking system.

3 Claims, 3 Drawing Sheets

(51) Int. Cl.
*B60T 13/72* (2006.01)
*B60T 17/02* (2006.01)
*B60T 17/22* (2006.01)

(52) U.S. Cl.
CPC ........... *B60T 17/22* (2013.01); *B60T 2220/04* (2013.01); *F02D 2250/41* (2013.01)

(58) Field of Classification Search
CPC ........ B60T 13/57; B60T 13/246; B60T 17/02; B60T 2220/04; B60T 13/241; B60T 13/74; B60T 7/042; B60T 17/22; B60K 6/543; B60Y 2400/81

USPC .............................. 303/114.3; 188/356–357

See application file for complete search history.

(56) References Cited

U.S. PATENT DOCUMENTS

| | | | | |
|---|---|---|---|---|
| 4,787,685 A | * | 11/1988 | Klein | B60T 8/90 303/115.3 |
| 5,961,189 A | * | 10/1999 | Lutteke | B60T 8/4013 60/412 |
| 5,971,500 A | * | 10/1999 | Voges | B60T 13/72 303/114.1 |
| 6,491,353 B2 | * | 12/2002 | Hackl | F02M 63/0225 303/10 |
| 2006/0158028 A1 | * | 7/2006 | Ichikawa | B60K 6/543 303/114.3 |
| 2014/0171264 A1 | | 6/2014 | Sundaresan | |
| 2017/0166179 A1 | * | 6/2017 | Fujita | F02D 41/3094 |

FOREIGN PATENT DOCUMENTS

| | | |
|---|---|---|
| EP | 1964740 A1 | 9/2008 |
| KR | 20030053940 A | 7/2003 |
| KR | 20030088951 A | 11/2003 |

* cited by examiner

MOTOR-VEHICLE BRAKING SYSTEM HAVING A VACUUM-OPERATED ASSISTANCE DEVICE

CROSS-REFERENCE TO RELATED APPLICATION

This application claims priority to European Patent Application No. 19 164 242.0 filed Mar. 21, 2019. The disclosure of the above application is incorporated herein by reference in its entirety.

FIELD OF THE INVENTION

The present invention relates to motor-vehicle braking systems provided with a vacuum-operated assistance device, or "booster", comprising a vacuum pump which is to be driven by the motor-vehicle engine, a fluid communication line between the vacuum pump and a chamber of said assistance device, for communicating a vacuum generated by said vacuum pump to said chamber, and at least one one-way valve interposed in said fluid communication line for enabling a flow of air only in the direction which goes from said chamber of the assistance device towards the vacuum pump.

PRIOR ART

A system of the above-indicated type is for example described and shown in document US 2014/0171264 A1. In the solution shown in this document, the internal combustion engine mechanically drives the vacuum pump through a friction clutch. The friction clutch is opened, in order to interrupt the mechanical connection between the vacuum pump and the internal combustion engine, when the action of the pump is not required, so as to avoid a useless waste of energy which generates a higher fuel consumption and a higher production of $CO_2$ at the exhaust.

It has been also proposed, again in order to deactivate the vacuum pump when its action is not required, to use an electrically actuated pump. However, this solution implies the use of an electric motor and an electronic circuit which controls the actuation of the pump as a function of a signal from a sensor which detects the pressure within the chamber of the assistance device.

Both the above-indicated known solutions have the drawback of implying the use of relatively costly and/or relatively bulky devices.

OBJECT OF THE INVENTION

The object of the present invention is that of reducing the waste of energy due to the vacuum pump being driven by the internal combustion engine, with the aid of extremely simple and inexpensive means.

SUMMARY OF THE INVENTION

In view of achieving the above-indicated object, the invention provides a motor-vehicle braking system having a vacuum-operated assistance device with all the features which have been indicated at the beginning of the present description and further characterized in that it also comprises:

a control valve, interposed along said fluid communication line between the vacuum pump and the chamber of the assistance device, said control valve having:

a first operative condition in which said control valve sets the inlet side of the vacuum pump in communication with said chamber of the assistance device, and a second operative condition in which said control valve sets the inlet side of the vacuum pump in communication with the atmosphere, and an actuating device for actuating the control valve and configured for:

setting the control valve in its first operative condition, in which the inlet side of the vacuum pump communicates with the chamber of the assistance device, when the pressure in the chamber of the assistance device is above a predetermined threshold value, setting the control valve in its second operative condition, in which the inlet side of the vacuum pump is in communication with the atmosphere, when the pressure in the chamber of the assistance device is below a predetermined threshold value.

Due to the above-indicated features, when the pressure in the chamber of the assistance device is lower than said threshold value, which means that in said chamber there is a vacuum sufficient for the regular operation of the braking system, the inlet side of the vacuum pump is in communication with the atmosphere. Therefore, in this condition the vacuum pump intakes air from the atmosphere and feeds air into the atmosphere (the outlet side of the vacuum pump is always in communication with the atmosphere). This condition corresponds to a minimum energy level which must be spent by the internal combustion engine in order to drive the vacuum pump. Therefore, in this manner, by the simple addition of one valve, having a reduced bulk and a relatively low cost, the problem is solved to avoid a useless energy waste in the conditions in which the action of the pump is not required. Therefore, this goal is achieved with no need of providing a friction clutch between the pump and the internal combustion engine or an electronically controlled electric motor for actuating the pump, as it is instead the case in the known solutions which have been mentioned above.

In a preferred embodiment, the control valve includes a valve member which is biased by a spring towards a first position corresponding to said first operative condition, in which the inlet side of the vacuum pump is in communication with the chamber of the assistance device. The same valve member is biased by the vacuum existing in the chamber of the assistance device towards a second position corresponding to said second operative condition, in which the inlet side of the vacuum pump is in communication with the atmosphere.

In braking systems of the above-indicated type, a pressure sensor is sometimes provided for detecting the pressure in the chamber of the assistance device, this sensor being adapted to communicate with an electronic controller which controls the stop and start function of the motor-vehicle. In this case, according to a further embodiment of the invention, said control valve may be associated to, and/or integrated with, the above-mentioned sensor.

Also in the case of the above-mentioned braking systems, a one-way valve may be provided which is associated with the vacuum pump and adapted to prevent a flow of oil vapours towards the chamber of the assistance device. In this case, according to a further embodiment of the invention, the above-mentioned control valve may be associated to, and/or integrated with, the above-mentioned one-way valve of the vacuum pump.

Also in the case of the above-indicated braking systems, there is provided a one-way valve associated to the chamber of the assistance device, and adapted to prevent a flow of air towards said chamber. According to a further embodiment, the above-mentioned control valve may be associated to, and/or integrated with, said one-way valve of the assistance device.

Further embodiments are not excluded anyhow, such as an embodiment wherein said control valve is a solenoid valve, having a solenoid which is energized by an electronic control units on the basis of a signal emitted by a sensor for detecting the pressure in the chamber of the assistance device.

BRIEF DESCRIPTION OF THE DRAWINGS

Further features and advantages of the invention will become apparent from the description which follows with reference to the annexed drawings, given purely by way of not-limiting example, in which.

DETAILED DESCRIPTION OF THE INVENTION

Figure 1:
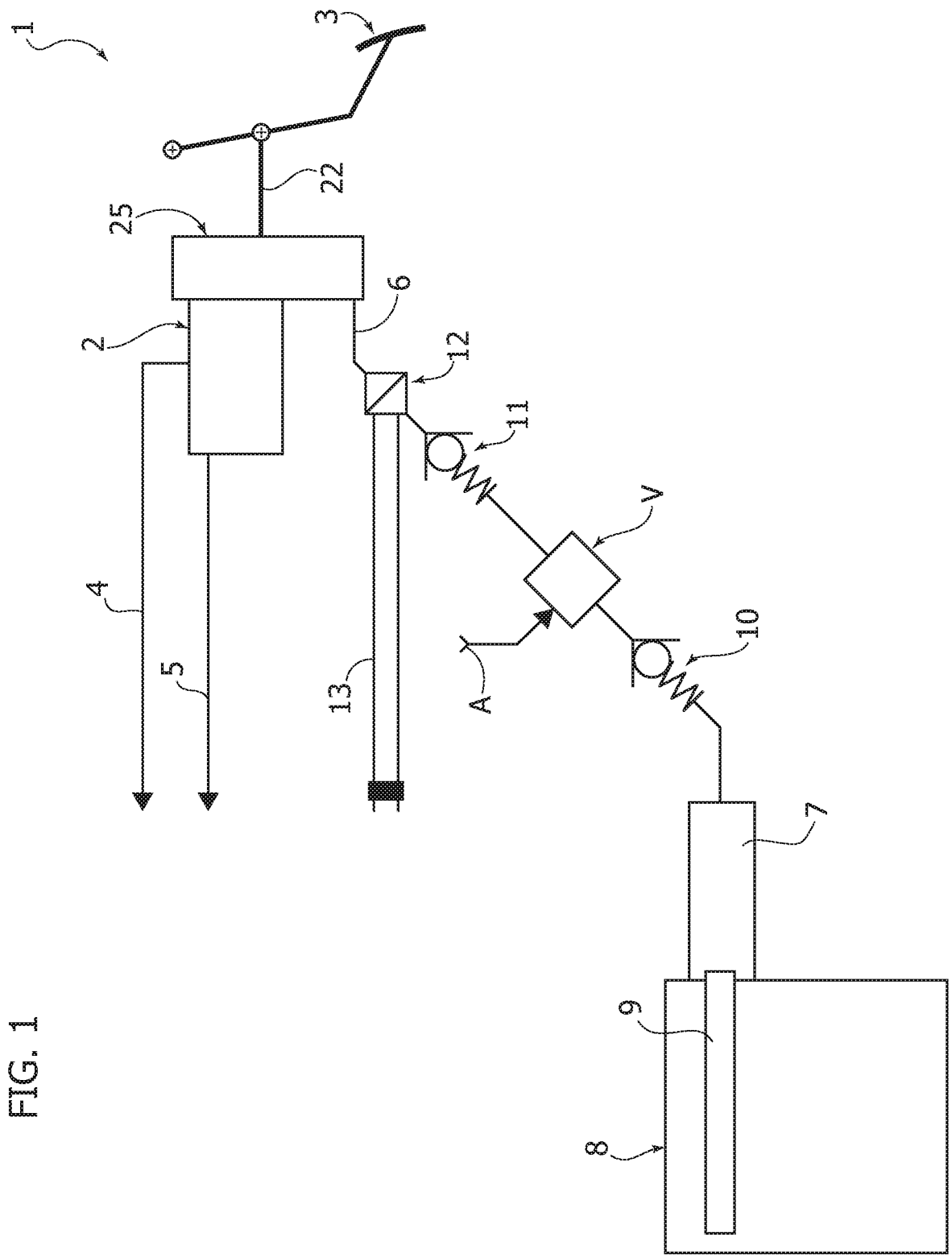
FIG. 1 is a diagram of an exemplary embodiment of a braking system according to the invention.

In FIG. 1, reference numeral 1 generally designates a motor-vehicle braking system comprising a master cylinder 2 which is actuated by a brake pedal 3 in order to feed pressurized hydraulic fluid to the brakes associated with the wheels of the motor-vehicle through two lines 4, 5.

Figure 2:
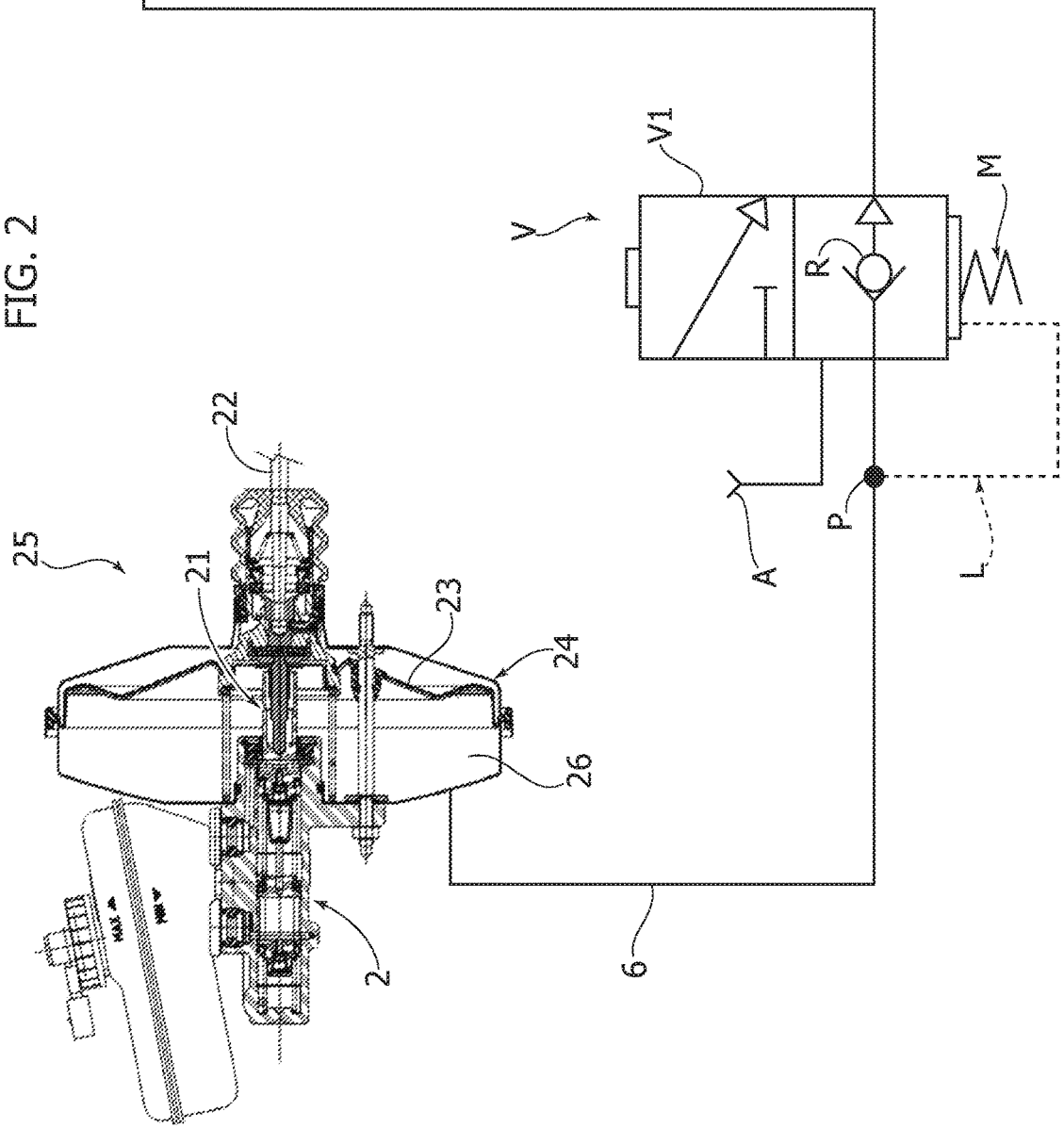
FIGS. 2, 3 are diagrams which show two different operative conditions of one embodiment of the invention.
Figure 3:
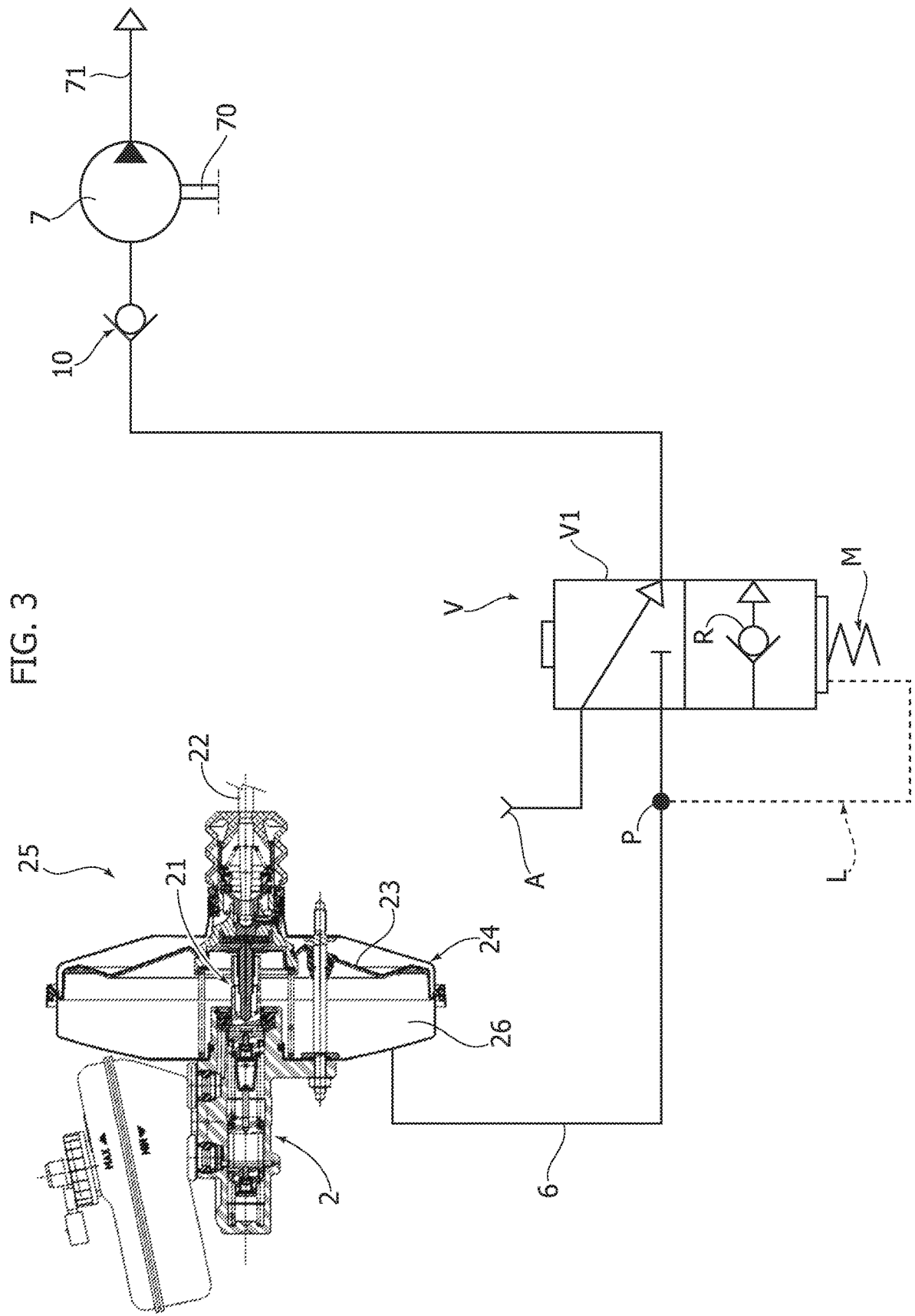

As shown in the purely exemplary representation of FIGS. 2, 3, the master cylinder 2 has an actuating stem 21 which is operatively connected both to the brake pedal 3 by means of the a rod 22, and to a diaphragm 23 arranged inside the casing 24 of an assistance device, or "booster", 25. The diaphragm 23 is facing towards a chamber 26 of the assistance device 25 which is in communication, through a fluid communication line 6, with the inlet side of a vacuum pump 7 which, according to the conventional art, is constantly driven by the crankshaft of the internal combustion engine 8 of the motor-vehicle (see FIG. 1). In the specific example illustrated herein, the shaft 70 of the pump 7 (FIG. 2) is driven in rotation by the camshaft 9 of the internal combustion engine 8 (FIG. 1), which on its turn is driven in rotation by the crankshaft.

Also according to the conventional art, the pump 7 intakes air from the chamber 26 of the assistance device 25, so as to generate a vacuum in this chamber. Due to this vacuum, when the brake pedal 3 is actuated, the diaphragm 23 is able to apply an assistance force to the stem 21 of the master cylinder (FIGS. 2, 3) which is added to the force generated by the pressure exerted onto the brake pedal 3.

Naturally, as already indicated in the foregoing, the structure, the configuration and the arrangement of the parts of the master cylinder 2 and the assistance device 25, as well as their operation, are not disclosed herein in detail, given that they can be made in any known way and do not fall, taken alone, within the scope of the present invention.

Also with reference to FIG. 1, along a fluid communication line 6 connecting the inlet side of the vacuum pump 7 to the chamber of the assistance device 25, there is provided at least one one-way valve, which enables a flow of air only in the direction which goes from the chamber of the assistance device 25 towards the inlet side of the pump 7. During operation, the pump 7 intakes air from the chamber of the assistance device 25 and feeds air into the atmosphere, to keep a desired vacuum level within the above-mentioned chamber.

Also with reference to FIG. 1 in the specific case illustrated herein, the braking system comprises a first one-way valve 10, which usually is integrated into the body of the vacuum pump 7, whose function is that of preventing a flow of oil vapours from the pump 7 towards the chamber 26 of the assistance device 25. A second one-way valve 11 is usually associated with and integrated into the assistance device 25 and has the purpose to prevent a flow of air towards the chamber 26 of the assistance device 25.

Also with reference to FIG. 1, in case the motor-vehicle is provided with a system for controlling a stop and start function, the system illustrated herein may comprise a pressure sensor 18 adapted to detect the level of pressure existing within chamber 26 of the assistance device 25 as well as to communicate an electric signal, through an electric line 13, to an electronic controller (not shown in FIG. 1) for controlling the stop and start function, in order to provide a start of the internal combustion engine in a stage in which the internal combustion engine have been stopped, but the vacuum within the assistance device 25 is insufficient.

As already indicated in the foregoing, the problem which is encountered in braking systems having a vacuum-operated assistance device lies in that the vacuum pump 7 is continuously mechanically driven by the internal combustion engine 8, with a resulting energy waste, also when an action by the pump is not required, i.e. also when within the chamber of the assistance device 25 there is already a vacuum sufficient for ensuring a regular operation of the assistance device.

In order to solve the above-mentioned problem, the invention provides the arrangement of a control valve V along the fluid communication line 6, which valve is adapted, in conditions in which within the assistance device 25 there is already a vacuum sufficient for insuring the regular operation of the braking system, to set the inlet side of the pump 7 in communication with a passage A (diagrammatically illustrated in FIG. 1) vented to the atmosphere, rather than with the chamber 26 of the assistance device 25. In other words, in the system according to the invention, thanks to the control valve V, when the action of the vacuum pump 7 is not required, the inlet side of the vacuum pump 7 is connected to the atmosphere. Therefore, in these conditions, the vacuum pump 7 intakes air from the atmosphere and feeds air back into the atmosphere (the outlet side of the vacuum pump is always in communication with the atmosphere). This condition corresponds to a condition of minimum energy consumption by the internal combustion engine for driving the vacuum pump 7.

It is to be noted in this regard that, for the purposes of the present invention, the vacuum pump may be made in any known way. The details of construction of the pump are not described nor shown herein, since they do not fall within the scope of the present invention and also in order to render the drawings simpler and easier to understand. At any rate, it is clearly evident that in the present description where reference is made to the vacuum pump being driven by the internal combustion engine the fact is meant that the vacuum pump has a rotating assembly which is rotated by the internal combustion engine, in the specific example through the camshaft of the internal combustion engine. FIGS. 2, 3 show the system with a representation of the assistance device 25 associated to the master cylinder 2 (already described in the foregoing). In the diagram of FIGS. 2, 3, there is only shown the one-way valve 10 associated to the vacuum pump 7. It is clearly understood that also in the diagrams of FIGS. 2, 3 the fluid communication line 6 may include also the further one-way valve 11 of FIG. 1, which is associated to the assistance device 25, as well as the sensor 12 communicating with the system for controlling the stop and start function. Also with reference to FIGS. 2, 3, 70 diagrammatically designates the actuating shaft of the vacuum pump 7, which is driven by the internal combustion engine. Reference 71 designates the outlet side of the vacuum pump 7, which communicates to the atmosphere.

Also with reference to FIGS. 2, 3, the control valve V is diagrammatically shown as comprising a valve member V1 having two operative positions. A spring M tends to hold the valve member V1 in a first operative position corresponding to a first operative condition of valve V, in which the inlet side of the vacuum pump 7 communicates with the chamber 26 of the assistance device 25, through a line including a one-way valve R which enables a flow only in the direction which goes from chamber 26 towards the vacuum pump 7.

The valve V is of any known type in which the position of the valve member V is sensible (through a line L) to the pressure existing at a point P which is always in communication with chamber 26 of the assistance device 25. Therefore, the vacuum existing in chamber 26 tends to move the valve member V1 in a second operative position, against the action of spring M. The second operative position of the valve member V1 is shown in FIG. 3. As diagrammatically shown, in this position, the inlet side of the pump 7 is no longer in communication with chamber 26 of the assistance device 25, but communicates instead with the passage A which is vented to atmosphere.

When the valve V is in its second operative condition, the vacuum pump 7 intakes air from the atmosphere and feeds air into the atmosphere and thus can be driven by the internal combustion engine with a minimum energy consumption.

The valve V is configured and dimensioned so that the vacuum effect causes a shift of the valve member from its first position to its second position when the pressure in the chamber 26 of the assistance device 25 decreases below a predetermined threshold value.

As already indicated, the valve V may be of any known type, with a valve member having two positions which sets an outlet of the valve in communication either with a first inlet of the valve or with a second inlet of the valve, as a function of the position of the valve member. The valve member V1 of valve V may be driven mechanically by the simple effect of the vacuum existing in chamber 26. For this purpose, a diaphragm-operating actuator may be for example provided, having a diaphragm facing a chamber which is in communication with the chamber 26 of the assistance device 25, so that the vacuum existing in chamber 26 causes a movement of the diaphragm which is transmitted for example through a connecting stem to the valve member. Diaphragm-operating actuator devices of this type are common and used in various applications, as known by the skilled experts. For this reason, the details of construction of the valve V are not described nor shown herein, also in order to render the drawings simpler and easier to be understood. It is in particular to be understood that the concept at the basis of the invention is that of providing a valve of the above-indicated type, independently from its structure and configuration, for the purpose of setting the inlet side of the vacuum pump in communication to atmosphere, rather than with a chamber of the assistance device 25, when the vacuum in this chamber is sufficient for the regular operation of the braking system.

As already indicated in the foregoing, the valve V may be an independent component provided along the fluid communication line 6, or it may be associated to, and/or integrated with, for example the one-way valve 10 of the vacuum pump 7, or the one-way valve 11 of the assistance device 25, or the sensor 12 communicating with the system for controlling the stop and start function.

As already indicated in the foregoing, in the case of the embodiment described herein, in which the valve member V is mechanically actuated by an actuator sensitive to the vacuum within chamber 26, the system is configured and arranged so that the inlet side of the vacuum pump 7 is set in communication with the passage A vented to atmosphere if the pressure within chamber 26 is below a predetermined threshold value, i.e. if within chamber 26 there is a vacuum sufficient for the regular operation of the braking system. In an actual exemplary embodiment, this threshold value was selected corresponding to an absolute pressure of 0.1 bars, i.e. a vacuum of 0.9 bars with respect to the atmospheric pressure.

It is also possible to provide a first threshold value for venting the inlet side of the vacuum pump to atmosphere when the pressure within chamber 26 of the assistance device 25 is decreasing, and a second threshold value, which activates the communication of the inlet side of the vacuum pump back with the chamber 26, when the pressure within this chamber is increasing, this second threshold value being selected for safety at a pressure level lower with respect to the first threshold value. In this manner, the system operates with a hysteresis, which avoids continuous valve shifts when the pressure is close to the threshold value.

However, the present invention does not exclude the case in which the control valve V is a solenoid valve, having a solenoid whose activation is controlled by an electronic controller on the basis of a signal emitted by a sensor detecting the pressure within chamber 26 of the assistance device 25.

In any case, the invention achieves the object of reducing the energy consumption of the internal combustion engine which is required for driving the vacuum pump during stages in which the vacuum within the assistance device 25 is already at a level sufficient for enabling the regular operation of the braking system. This result is obtained with means which are extremely simple, inexpensive and with a reduced bulk.

Naturally, while the principle of the invention remains the same, the details of construction and the embodiments may widely vary with respect to what has been described and illustrated purely by way of example, without departing from the scope of the present invention, as defined in the annexed claims.

What is claimed is:

1. A motor-vehicle braking system, having a vacuum-operated assistance device including a vacuum pump which is to be driven by a motor-vehicle engine, a fluid communication line between the vacuum pump and a chamber of said assistance device, for communicating a vacuum generated by said vacuum pump to said chamber, said braking system further comprising:
   a control valve, interposed along said fluid communication line, and having:
      a first operative condition, in which said control valve sets an inlet side of the vacuum pump in communication with the chamber,
      a second operative condition, in which the control valve sets the inlet side of the vacuum pump in communication with the atmosphere, and a one-way valve included within said control valve, which is operative when the control valve is in its first operative condition to enable a flow of air only in a direction which goes from said chamber towards the vacuum pump;

a device for actuating the control valve, which is configured for:
  setting the control valve in its first operative condition, in which the inlet side of the vacuum pump communicates with said chamber, when the pressure within the chamber is above a predetermined threshold value, and
  setting the control valve in its second operative condition, in which the inlet side of the vacuum pump communicates with the atmosphere when the pressure within the chamber is below a predetermined threshold value;

another one-way valve integrated into the vacuum pump and configured to prevent a flow of oil vapours from the vacuum pump towards the chamber; and an additional one-way valve integrated into the assistance device and configured to prevent a flow of air from the fluid communication line towards said chamber;

wherein the control valve includes a valve member which is biased by a spring towards a first position corresponding to said first operative condition, in which the inlet side of the vacuum pump is in communication with the chamber, and wherein the valve member is directly exposed to pressure existing at a point along said fluid communication line between the chamber and the control valve, so that a vacuum existing in said chamber directly causes the valve member to move towards a second operative position, against an action of said spring, said second operative position corresponding to said second operative condition, in which the inlet side of the vacuum pump is in communication with the atmosphere.

2. The braking system according to claim 1, further comprising a sensor for detecting the pressure within the chamber of the assistance device, said sensor being provided for communicating with a controller for controlling a stop and start function of the motor-vehicle, wherein the control valve is associated to, and/or integrated with, said sensor.

3. The braking system according to claim 1, further comprising an electronic control unit, wherein said electronic control unit is programmed with a first threshold value of the pressure in the chamber of the assistance device, to vent the inlet side of the vacuum pump to atmosphere when the pressure in the chamber is decreasing, and a second threshold value of the pressure in the chamber, for reactivating the communication of the inlet side of the vacuum pump with the chamber, when the pressure in the chamber is rising, this second threshold value of the pressure in the chamber being lower than the first threshold value.

* * * * *